June 4, 1940.  H. F. PATTERSON  2,203,177

POWER TRANSMISSION

Filed Oct. 26, 1937  3 Sheets-Sheet 1

INVENTOR
Herbert F. Patterson.
BY
ATTORNEYS.

Patented June 4, 1940

2,203,177

UNITED STATES PATENT OFFICE 2,203,177

POWER TRANSMISSION

Herbert F. Patterson, St. Clair Shores, Mich., assignor to Chrysler Corporation, Highland Park, Mich., a corporation of Delaware Application October 26, 1937, Serial No. 171,162

14 Claims. (Cl. 74—189.5)

This invention relates to power transmissions and refers more particularly to improvements in variable speed ratio drives for use in driving motor vehicles or wherever it is desired to vary the speed ratio drive between driving and driven parts of any mechanism or machine.

More particularly my invention has to do with improvements in fluid couplings and has among its objects the provision of an improved and simplified transmission embodying a fluid coupling and associated mechanism so constructed and arranged as to automatically vary the driving torque between a prime mover, such as the vehicle driving engine, and the parts to be driven, such as the driving ground wheels of the vehicle. My invention therefore provides improvements in torque converters.

Heretofore, previous efforts directed to fluid coupling torque converters have largely centered around the provision of fluid couplings having curved vanes or blades intended to produce reactive forces in the circulating fluid to provide the torque multiplication. Such constructions are open to a number of objections among which may be noted that curved blades are very expensive to manufacture and require a high degree of finish accuracy; also, many variables are introduced in the structure and operation and it is very difficult to obtain standardization of results.

It is accordingly a further object of my invention to overcome the aforesaid difficulties and objections preferably by the provision of a fluid coupling of the inward flow, or as it is more commonly known in the art, of the "inflo-turbine" type having straight radial or non-curving blades having no tendency to react backwards in the fluid circulation, my improvements nevertheless providing for torque multiplication ranging between desired limits. I preferably arrange these limits between a set gear reduction to an upper limit of a direct drive, assuming no slippage in the fluid coupling.

Further objects and advantages of my invention reside in the provision of improved controls for the manipulation of fluid coupling drives, and in the novel combination and arrangement of parts disclosed in the illustrative embodiments of my invention. In the accompanying drawings in which like reference characters indicate corresponding parts.

Fig. 3a is a detail sectional view of a portion of the Fig. 1 transmission, modified to include a pressure supply for the oil in the transmission casing.

In the drawings, reference character 10 represents a power driving shaft, such as the crankshaft of a motor vehicle engine, this shaft being connected at 11 with the flywheel 12. The flywheel carries the impeller member 13 of a fluid coupling A, which is of the "inflo-turbine" type, this impeller comprising inner and outer similarly dished cover plates 14 and 15 between which extend the circumferentially spaced radially arranged vanes 16. The cover plate 15, in this instance, is formed as a part of the flywheel 12. The spaces between adjacent vanes provide passages for a suitable fluid, such as oil, entering at 17 and curving outwardly around cover 14 for discharge at 18.

Figures 8, 9:
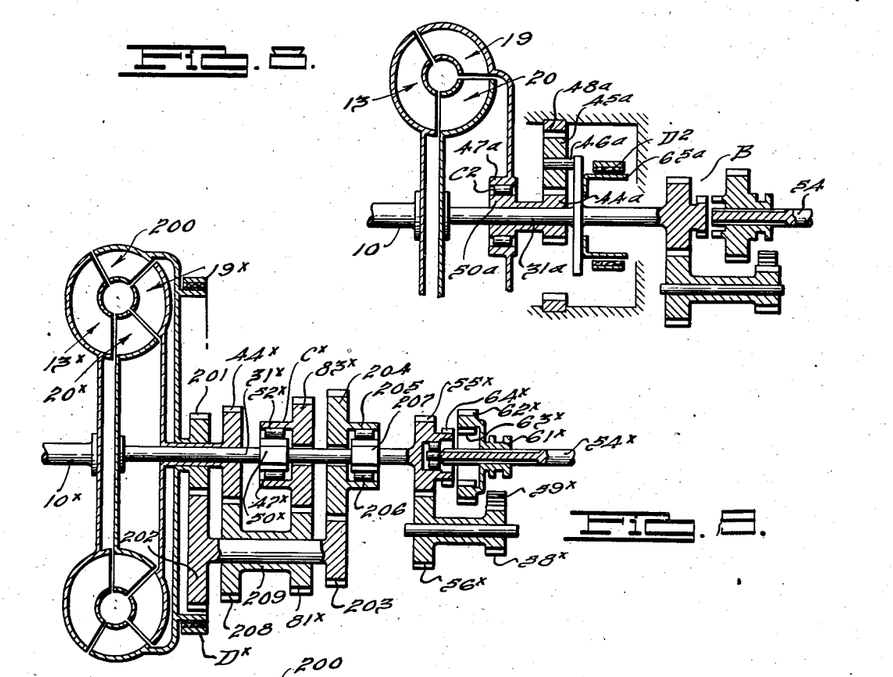
Fig. 8 is a diagramatic sectional elevational view illustrating a modified arrangement of the mechanism of Fig. 1.
Fig. 9 is a further diagramatic sectional elevational view illustrating another modification of my invention in which more than two runner segments are employed.
Figure 10:
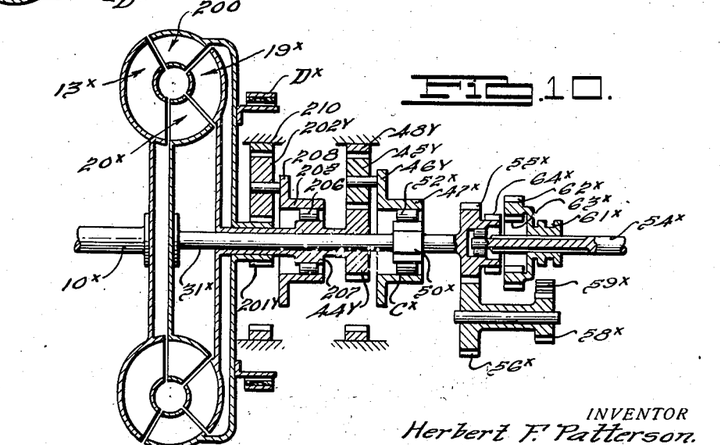
Fig. 10 is another diagrammatic sectional elevational view illustrating a further modification of my invention employing more than two runner segments and embodying planetary gearing.

The fluid delivered by impeller 13 passes successively to a plurality of segmental runner members, and while these may be more than two in number, as illustrated in Figs. 9 and 10, I have illustrated in Figs. 1 to 8 only two runner segments comprising a primary or intermediate runner 19 and a secondary or final driven runner 20. Where more than two segmental runners are employed, any two adjacent segments in the direction of fluid circulation may be deemed respectively as the primary and secondary runners, preferably the last two of any such series. The runner segments 19 and 20 respectively have radial vanes 21 and 22 corresponding in arrangement to vanes 16. Vanes 21 are disposed between covers 23, 24 and vanes 22 extend between covers 25, 26, the arrangement being such that the fluid is circulated, during rotation of shaft 10, around the annular vortex chamber 27 in passing from the impeller 13 to runner segment 19. The fluid is delivered at 28 from runner segment 19 to runner segment 20 as will be readily apparent.

Figures 1, 2, 4, 5, 6:
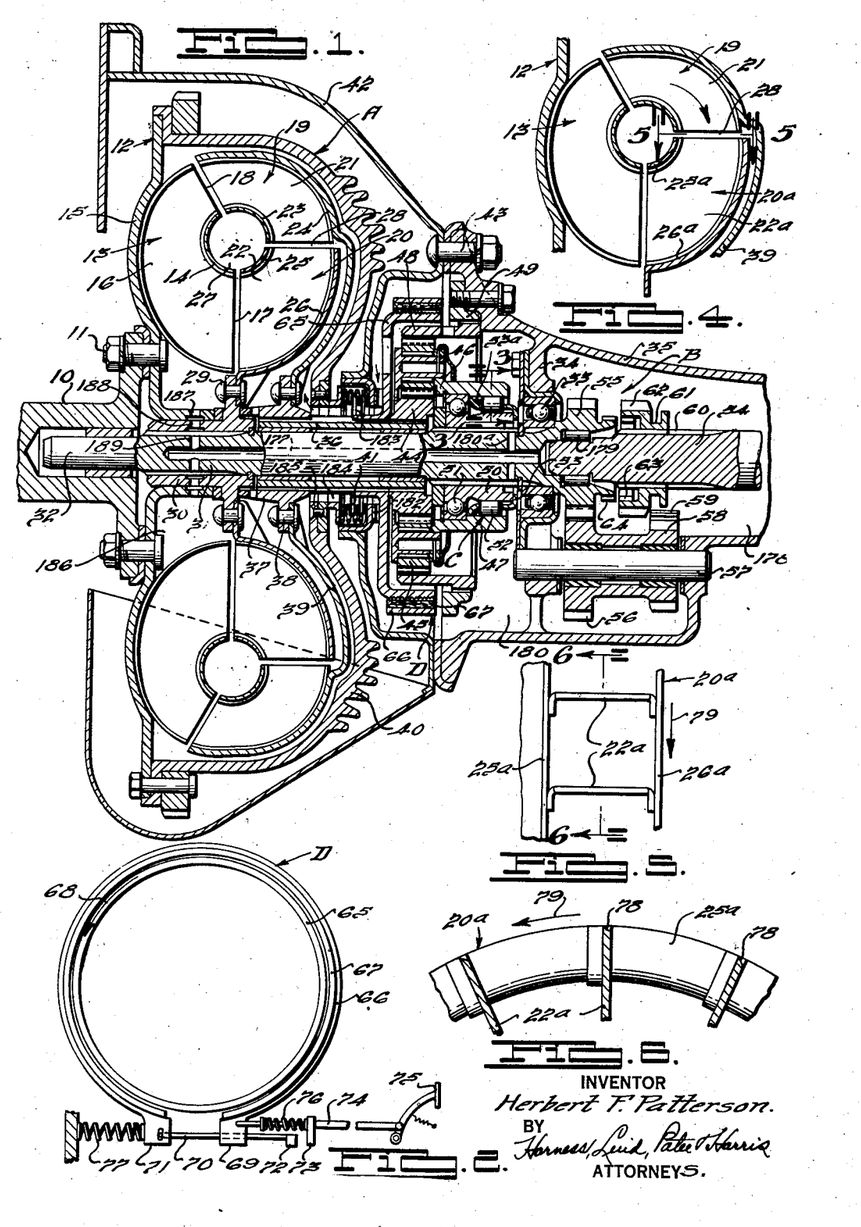
Fig. 1 is a sectional elevational view showing my improved power transmission embodying a planetary gear type of speed reduction train.
Fig. 2 is a diagrammatic elevational view of my brake control for assisting manipulation of the driving control mechanism.
Fig. 4 is a fragmentary view of a further slightly modified form of fluid coupling.
Fig. 5 is a detail plan view taken as indicated by line 5—5 of Fig. 4.
Fig. 6 is a sectional elevational view along line 6—6 of Fig. 5.

The secondary segment 20 is mounted at 29 on a hub 30 drivingly secured to the primary or intermediate driven shaft 31 piloted forwardly at 32 in shaft 10. Shaft 31 extends rearwardly through a bearing 33 carried by the wall 34 of a gear casing 35 adapted to house the forward and reverse driving gearing B.

Rotatably journaled on shaft 31 is a hollow shaft 36 drivingly mounting a hub 37 connected at 38 with a plate 39 which is an extension of cover 24 for supporting runner segment 19. Flywheel 12 carries a rear enclosure member 40 for fluid coupling A, the inner end portion of member 40 freely surrounding shaft 36 and having a fluid seal 41 with an outer casing structure 42 fastened at 43 to the gear casing 35. The fluid in coupling A is trapped between flywheel 12 and enclosure member 40.

Hollow shaft 36 drivingly carries a sun gear 44 meshing with a plurality of planetary pinions 45 having a carrier 46 formed with a cylinder 47 providing the outer element of an overrunning clutch C. Pinions 45 mesh with an internal gear 48 non-rotatably secured at 49 to casing 35.

Clutch C further includes the inner cam element 50 fixed to shaft 31 and journalling cylinder 47 by a thrust journal bearing 51. Clutch rollers 52 spaced by the cage 53 control the overrunning and clutching action between elements 47 and 50. A suitable and customary spring 53a yieldingly urges rollers 52 toward their driving relation relative to cam 50.

Returning to the gearing B, the primary shaft 31 pilots the secondary driven shaft 54. Shaft 31 drives a gear 55 meshing with gear 56 journalled on countershaft 57, a countershaft reverse gear 58 being driven with gear 56 and meshing with reverse idler gear 59. Splined at 60 on shaft 54 for manual shifting movements at collar 61 is the clutch gear 62 having teeth 63 engageable with teeth 64 of gear 55 for directly coupling shafts 31 and 54 when gear 62 is shifted forwardly. When gear 62 is shifted rearwardly to mesh with idler 59, a reverse drive is transmitted from shaft 31 to shaft 54 through the countershaft gearing. Any suitable manual mechanism may be arranged to selectively shift the clutch gear 62 to drive the vehicle forwardly or rearwardly.

In order to expedite the shifting of clutch gear 62 out of engagement with teeth 64 or gear 59, especially where the idle of the engine is relatively high, I have provided means for relieving the engine acting through the fluid coupling on the clutch gear 62, the arrangement comprising a rocking brake mechanism D for unloading the gearing B.

Drivingly fixed to hollow shaft 36 is a brake drum 65 (see Figs. 1 and 2) and surrounding this drum is a contractable band 66 having a friction brake lining 67. I have provided manually operable means adapted to first cause lining 67 to arrest rotation of the shaft 36 and then impart limited rotative movement to the drum and segment 19 in a direction opposite to its normal rotation induced by the engine and indicated by arrow 68.

The band end 69 slidably guides a thrust rod 70, one end of which is connected to band end 71, the other end having a lug 72 engageable by actuator 73 carried by rod 74 which extends for convenient operation, as by a pedal 75. Actuator 73 is normally spaced from lug 72 and is operably connected with band end 69 through a spring 76. Band end 71 has a yielding abutment provided by a relatively heavy spring 77 adapted to return the parts after their braking operation, assisted by the inherent expanding tendency of band 66.

In the operation of the mechanism as a whole, as thus far described with the clutch gear 62 in the illustrated position, the transmission is in neutral and shaft 54 will not be driven. When it is desired to drive the vehicle forwardly, the operator shifts the clutch gear 62 forwardly to engage teeth 63 and 64 for directly coupling shafts 31 and 54. The vehicle is now ready for acceleration forwardly. For reverse, clutch gear 62 is shifted rearwardly to mesh with idler gear 59.

With the vehicle standing still, clutch gear 62 in neutral, and the engine running, impeller 13 will rotate at engine speed and cause the fluid to rotate runner segments 19 and 20 at about the speed of the impeller. Assuming the value of the planetary gear reduction drive to be 3 to 1, it will be apparent that shaft 31 and cam 50 will rotate at three times the speed of cylinder 47, the cam thus overrunning and the rollers 52 being free from wedging action.

While gearing B can be operated without actuating brake D, I prefer to use this brake to more quietly engage the teeth of the clutch gear 62 and especially to assist in unloading these teeth when shifting out of tooth engagement. Therefore, in shifting clutch gear 62 forwardly for the forward vehicle drive, the brake D is first applied by pedal 75 to stop segment 19. This has the effect of stopping the application of rotative energy of fluid leaving segment 19 and entering segment 20, so that there is no driving force applied to shaft 31 thereby permitting the shift of clutch gear 62 without objectionable noise at teeth 63, 64 or damage thereto.

Brake D is then released, the engine still idling, whereupon segments 21 and 20 will be held stationary because of the load on shaft 54. If the engine idle is relatively high, the vehicle may start to creep forwardly which, if not desired, may be eliminated by applying the usual vehicle ground wheel brake or the brake D.

Upon opening the engine throttle, the vehicle is accelerated forwardly at the 3 to 1 torque multiplication provided by the planetary gearing. Shafts 54 and 31 tend to remain stationary, along with segment 20, so that segment 19 performs the initial drive to shaft 54 through the gearing 44, 45 and overrunning clutch C by wedging rollers 52 thereof.

As soon as segment 19 starts its rotation in driving the vehicle, then segment 20 receives a driving force occasioned by the rotative energy of the fluid circulated from segment 19 to segment 20. As segment 19 progressively increases in speed, during acceleration of the vehicle, segment 20 thereby receives a corresponding increase in driving torque from segment 19 and since there is only 100 per cent of the engine torque available (neglecting fluid friction and other unavoidable minor losses), the torque multiplication to to shaft 54 progressively diminishes in proportion to the increase in torque received by segment 20 from segment 19 and applied without multiplication directly from shaft 31 to shaft 54.

Segment 19 continues to drive three times the speed of segment 20 until such time as the torque resistance on shaft 54 is overcome by power imparted to segment 20 by segment 19. The speed of segment 20 then approaches that of segment 19 which in turn approaches the speed of impeller 13. As soon as segment 20 takes all of the load, viz., as soon as shaft 31 and cam 50 rotate faster than cylinder 47, then segment 19 tends immediately to rotate at approximately the same speed as that of impeller 13 and segment 19 does not impart a drive but coasts and thereby acts as a fluid passage conducting medium for delivering the fluid from impeller 13 to segment 20 much as though impeller 13 and segment 19 were a continuous unit. The driving speed ratio under such conditions is now substantially 1 to 1 or direct between shafts 10 and 54, it being understood that this will ordinarily vary slightly owing to inherent slippage in the fluid coupling.

During the aforesaid approach to the direct "cut-in" between shafts 10 and 54, it will be apparent that the torque applied to shaft 54 from segment 19 is a maximum at the start of vehicle acceleration and decreases through an infinite series to zero at the direct cut-in. Likewise, the torque applied to shaft 54 from segment 20 is zero at the start of vehicle acceleration and increases through an infinite series to a maximum at the direct cut-in. Thus, all of the available torque of impeller 13 is utilized during vehicle acceleration but with progressively decreasing torque multiplication. This, of course, is a desirable condition in rapidly and smoothly accelerating the vehicle.

The speed at which the direct cut-in normally takes place may be varied by altering the proportions or capacities of the fluid coupling impeller and segments as well as by varying the value of the reduciton gear train. For example, reducing the capacity of segment 20 will act to increase the cut-in speed which ordinarily is preferably arranged to take place when the vehicle is normally accelerated to a speed of 20 to 30 miles per hour although this may be varied as conditions require. It is, of course, assumed that ordinary commercial conditions of reduction gearing at the differential wheel drive (not shown) exist, although by proportioning the coupling parts and gear train value the mechanism may readily be caused to perform with widely varying characteristics.

My power transmission provides for use of the engine as a brake while coasting, since under such conditions shafts 54 and 31 being coupled by clutch gear 62, segment 20 drives impeller 13 through segment 19 which is allowed to coast by reason of the overrunning clutch C.

I will now describe the operation of brake D in connection with shifting the clutch gear 62 from forward drive to reverse. When the vehicle has been brought to a stop, with the engine idling, the operator depresses pedal 75. The parts are so proportioned that before actuator 73 engages lug 72, spring 76 acts to contract band 66 to arrest rotation of drum 65, spring 77 having sufficient force to anchor band end 71. Then, upon further depression of pedal 75, actuator 73 engages lug 72 and the entire assembly including drum 65 and band 66 are given a slight rotation in a direction opposite to arrow 68. Such movement unloads segment 19 and hence segment 20 from any forward driving tendency thereby unloading teeth 63, 64 and permitting clutch gear 62 to be easily shifted to neutral and then to reverse, if desired. If, during forward or rearward shifting of clutch gear 62, the sets of teeth do not readily engage due to "dead ending" then the brake D may be momentarily released.

The drive in reverse is just the same as that described for forward, insofar as the fluid coupling A and the torque multiplying gearing including overrunning clutch C are concerned. Shaft 31 in such instance drives shaft 54 in reverse through gearing 55, 56, 58, 59 and 62.

I have also provided means for filling the fluid coupling when the drive thereto takes place; also means for preventing air binding in the coupling and a system which allows for expansion of the emulsified oil when heated as a result of the oil circulation in the coupling.

Shaft 31 has an axial passage 177 opening rearwardly at the piloted forward end of shaft 54 so that this passage is open to the gear chamber 178 in casing 35 through the roller bearing 179 for shaft 54. Chamber 178 contains lubricating oil which circulates to the fluid coupling, this chamber being rearwardly sealed and communicating forwardly through bearing 33 with the oil containing chamber 180 containing the planetary gearing, brake D and clutch C. Passage 177 is also directly open to chamber 180 by the shaft radial branch passage 180a.

Chamber 180 is open to the space 181 between enclosure member 49 and plate 39 through the passages 182, 183 and 184 viz., between seal 41 and shaft 31 and between this shaft and the inner annular hub portion 185 of member 40. The forward end of passage 177 is always in communication with the coupling hub chamber 186 through the system of communicating passages 187 and 188 respectively formed in cover plate 15 and hub 30, passage 188 always communicating with branches 189 of passage 177.

By reason of the above system of passages and reservoirs, when the coupling starts to drive, the residual oil in the coupling is thrown by centrifugal force outwardly in the coupling and displaces air therein which is forced inwardly through passages 187, 188, 189 to passage 177 and thence to chambers 180 and 178. Meantime the coupling fills with oil, caused by suction of oil displacement in the coupling, the replenishing oil travelling from chambers 178 and 180 through passages 182, 183 and 184. Expansion of the hot emulsified oil may readily take place through either of the aforesaid passage systems between the coupling and chambers 180 and 178. When the coupling is brought to rest, a certain amount of the oil from the coupling will flow by gravity through the systems of passages to the chambers 180 and 178, the oil storing capacity of the latter being adequate to fill the coupling and still afford sufficient oil to lubricate the mechanisms in these chambers during operation of the transmission as a whole.

Fig. 3a illustrates a portion of the Fig. 1 structure modified to include a suitable pressure supply of oil to insure proper filling of the fluid coupling at all times. In this instance the coupling and gear casing housings are at all times filled with oil, chamber 180 being under a pressure of approximately one pound, although I contemplate varying the pressure to suit conditions from say one-half of a pound to as high as approximately 10 pounds. If the oil pressure is localized where ultimately desired, viz., in the fluid coupling, then any form of oil pump and piping conduit to the coupling may be employed. As illustrated, storage tank S is vented at S' and is partially filled with oil to provide a head through pipe S² for chamber 180 to fill the coupling through passages 182, 183 and 184 as before described for Fig. 1, any air being carried out of the coupling as in Fig. 1. Emulsification of the hot oil and attendant expansion causes the oil to enter tank S by pipe S², such oil returning to the chamber 180 as needed to keep the system filled.

Referring now to Figs. 4, 5 and 6 the parts are identical to corresponding parts in Fig. 1 with with the exception that the fluid receiving edges of vanes 22a of segment 20a are bevelled or chamfered at 78 between inner and outer covers 25a and 26a. This formation at the ends of vanes 22a may be employed in lieu of a rocking type brake D in which instance the brake may be of conventional design for merely holding drum 65 stationary. When so applied, segment 19 will be fixed and the fluid entering segment 20a will strike chamfers 78 and impart to segment 20a a slight rotative drift in its normal direction of rotation indicated by arrow 79 in Figs. 5 and 6. The resulting rotative drift of shaft 31 will facilitate forward and rearward shifting engagements of the clutch gear 62, and since segment 19 will be held, the clutch gear may be easily disengaged as it will be unloaded from the engine idling force at segment 20a. The slight rotative drift of segment 20a will not be sufficient to impart a drive to shaft 31 of sufficient power to interfere with easy disengaging operation of clutch gear 62. Obviously, the chamfer at 78 may be formed in the opposite direction, if desired, to drift segment 20a opposite to arrow 79; or in further variation the ends of the vanes 21ª (see Fig. 6A) of segment 19 adjacent gap 28 may be deflected at 80 in one direction or another and the vanes 22 of segment 20 formed radially throughout as in Fig. 1 so that when segment 19 is held the fluid leaving vanes 21ª will be given a slight deflection across gap 28 to rotatively drift segment 20a as in the case with Fig. 4. In any event the deviation of vanes 21 or 22, in lieu of a rocking type brake, is not such as to alter their function since I do not rely on obtaining fluid reactions in the segment passages to obtain torque multiplication or variable torque delivery. Furthermore, I do not consider it to be necessary to a successful operation of any power transmission to employ a rocking brake or the drifting action of segment 20, such means being provided by way of expediting shifting movements of the clutch gear 62 especially where relatively high engine idle is employed.

Figures 3, 5, 6, 7:
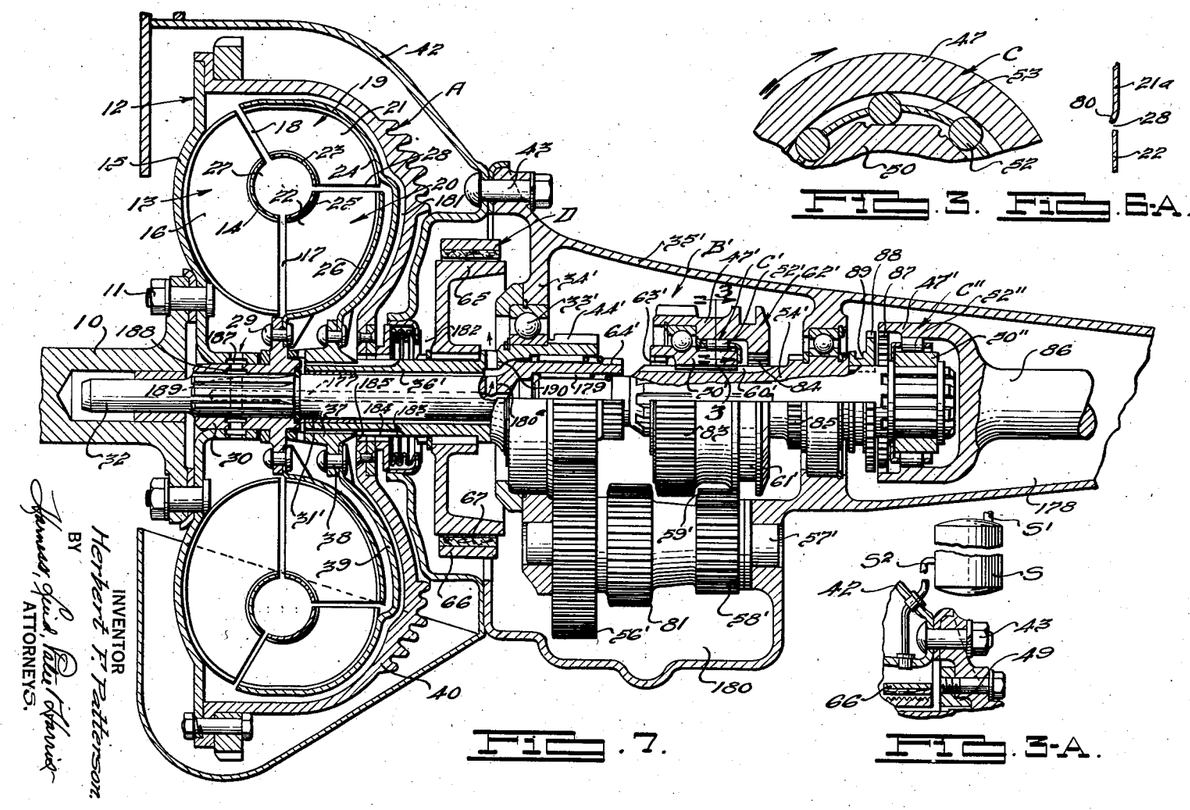
Fig. 3 is a detail sectional view through line 3—3 of Fig. 1.
Fig. 7 is a view corresponding to Fig. 1 but illustrating a modified form of my invention embodying a countershaft gear type of speed reduction train.

Referring now to Fig. 7, I have illustrated a modified arrangement of torque multiplying gearing. In Fig. 7 similar reference characters represent parts which may be identical with Fig. 1 while primed characters represent parts of similar function but of different construction.

In Fig. 7, segment 19 drives hollow shaft 36' formed with a driving pinion 44' rearwardly of bearing 33' in wall 34' of casing 35' for the gearing B'. Segment 20 drives shaft 31' which terminates rearwardly in the clutch teeth 64'. Countershaft 57' carries gear 56' meshing with pinion 44', reverse gear 58' meshing with idler 59', and a gear 81 which is the torque multiplying gear for the forward drive.

Driven shaft 54' is splined at 60' to slidably and drivingly receive the shifting device 62', shiftable at 61', this device comprising an inner cam member 50' and an outer cylindrical member 47' of overrunning clutch C' constructed as in Fig. 3 with rollers 52'. The members 50' and 47' are connected by a thrust journal bearing 82, the inner member 50' carrying teeth 63' for clutching with teeth 64' while the outer member 47' carries gear teeth 83 selectively meshing with gear 81 or idler 59'. When teeth 83 are meshed with idler 59' for reverse, clutch teeth 84 of member 47' are also clutched with teeth 85 of shaft 54' to lock out clutch C'.

In order to facilitate shifting of the device 47', I may also provide a second overrunning clutch C" between shaft 54' and the secondary driven shaft 86, this clutch being of opposite action to the Fig. 3 arrangement since normally the inner cam 50" will drive shaft cylinder 47" through rollers 52", shaft 86 overrunning shaft 54' when rotating at a faster rate. Cylinder 47" carries teeth 87 engageable with teeth 88 of the lock-up shifter 89 so that clutch C" may be rendered inoperative when desired, especially when gear 83 meshed with reverse idler 59'. As is customary with commercial "free-wheeling" devices, shifter 89 is preferably arranged for shifting to lock-up selectively in response to rearward shifting of device 47' into its reverse drive position, or by a separate manual shifter in accordance with well known practice in the art.

In the operation of the Fig. 7 mechanism, when control device 47' is positioned as illustrated, the transmission is in neutral. When shifted forwardly, just sufficiently to engage gear 83 with gear 81, it will be apparent that segment 20 merely coasts with segment 19, the latter driving shaft 36' and transmitting a reduction drive through gears 44', 56', 81 and 83 to shaft 54' through overrunning clutch C'. Shaft 54' drives shaft 86 through clutch C" or directly through teeth 88, 87 if shifter 89 is in its rearward lock-up position. This drive is therefore in constant torque multiplication through the countershaft reduction gearing, the fluid coupling, in effect, comprising an impeller 13 and a single runner 19.

When variable torque delivery is desired, as in the Fig. 1 structure, control device 47' is shifted further forwardly from neutral or from its aforesaid position to clutch teeth 63' with teeth 64'. Now segment 20 is directly coupled with cam member 50' and segment 19 is drivingly connected with overrunning clutch member 47' through the torque multiplying countershaft gearing. In such position of control, the variable torque drive to shaft 54' is identical in respect to the functioning of segments 19 and 20 as in the Fig. 1 embodiment.

In shifting to reverse, control device 47" is moved rearwardly to engage gear 83 with idler 59' and teeth 84 with teeth 85, shifter 89 being also moved to engage teeth 88 with teeth 87. Under such conditions segment 20 merely drifts with segment 19, the latter driving shaft 54' through the countershaft reverse train 44', 56', 58', 59' and 83.

While clutch C" may be locked-out at will and even dispensed with altogether if desired, its inclusion in the mechanism is often desirable to permit the engine to slow down while the vehicle and shaft 86 overrun shaft 54' since otherwise either the engine or the vehicle is driving the control shifter 47' in between its positions of shifting control rendering difficult the sliding of the mating gear and clutch teeth for effecting further gear changes.

The Fig. 7 arrangement has certain advantages over the Fig. 1 arrangement in that the segment 20, being the last of the series, may be readily cut out of the driving system by connecting the primary runner segment 19 through the reduction gearing to the driven shaft 54' for a constantly acting torque multiplication of fixed ratio. Also, it is obviously possible to obtain as many driving speed ratios as may be desired between the countershaft and driven shaft 54' by the addition of further gear sets between these parts.

In Fig. 7 I have illustrated the same oil circulating system and air escape as shown and described in connection with Fig. 1 and designated by the parts 177 to 189. Because of the hollow shaft 36' extending rearwardly beyond bearing 33' it is desirable to provide this shaft with a passage 190 always in communication with passage 180ª so that passage 177 is open to chamber 180.

In Fig. 8 I have diagrammatically illustrated a further modified arrangement which differs from Fig. 1 primarily in that the overrunning clutch $C^2$ is connected in the drive from segment 19 to the torque multiplying gearing. This arrangement is somewhat less preferable than my Fig. 1 arrangement since the gear train parts run at driven shaft speed instead of a lesser speed (by the amount of the gear reduction) when driven from segment 19 as in Fig. 1.

In Fig. 8 segment 19 directly drives cylinder 41a, the cam 50a being free from shaft 31a but connected to sun gear 44a. Planet pinion 45a meshed with fixed internal gear 48a, and has its carrier 46a fixed to shaft 31a and to the drum 65a of the rocking brake $D^2$ similar to brake D. Shaft 31a connects for forward or reverse drive with shaft 54 through the same gear control mechanism B as aforesaid. As before, segment 19 initially drives shaft 31a for vehicle acceleration through clutch $C^2$ and the planetary gearing with a decreasing torque multiplication as segment 20 builds up its direct torque drive to shaft 31a until such time as segment 20 takes over the entire drive to shaft 31a. The oil circulating system of Fig. 1 is preferably incorporated in the Fig. 8 arrangement but is not illustrated in the diagrammatic showing of parts.

In Fig. 9 I have employed reference characters similar to those in Figs. 1 and 7 but given an exponent "x" where the parts are substantially similar in their respective functions. Thus drive shaft $10^x$ drives impeller $13^x$ as before, the primary and secondary runner segments being respectively designated as $19^x$ and $20^x$. In this instance a further similar runner segment 200, conveniently designated as an auxiliary runner segment, is interposed between segments $13^x$ and $19^x$ and has the function of providing an initial drive auxiliary to the drive provided as before by the primary and secondary segments $19^x$ and $20^x$ respectively.

The auxiliary segment 200 is directly drivingly connected to a low speed drive pinion 201 meshing with countershaft gear 202 the latter carrying gear 203 meshing with gear 204 free on the primary or intermediate driven shaft $31^x$. This gear train affords a forward low gear ratio drive from shaft $10^x$ through segment 200 to shaft $31^x$ by reason of an overrunning clutch comprising drive cylinder 205 carried by gear 204, clutch rollers 206, and driven cam 207 fixed to shaft $31^x$. Any suitable manually controlled braking means $D^x$ is provided for segment 200, this braking means having the function of the aforesaid brake D. As before, the secondary driven shaft $54^x$ may be directly drivingly connected to shaft $31^x$ for forward drive of the vehicle or connected to shaft $31^x$ through a reverse gear set to drive the vehicle in reverse. Thus, shaft $31^x$ has a drive pinion $55^x$ carrying direct drive clutch teeth $64^x$ which are engageable with clutch teeth $63^x$ of the gear $62^x$ shiftable at $61^x$ in a forward direction for direct couple of shafts $31^x$ and $54^x$. Pinion $55^x$ meshes with countershaft gear $56^x$, a second countershaft gear $58^x$ meshing with reverse idler gear $59^x$, the latter being meshed with gear $62^x$ when shifted rearwardly to drive the vehicle in reverse.

Primary segment $19^x$ is directly drivingly connected to gear $44^x$ loose on shaft $31^x$, this gear meshing with gear 208 clustered with gear $81^x$ on a countershaft 209 free to turn relative to the countershaft cluster gears 202, 203. Gear $81^x$ meshes with gear $83^x$, also loose on shaft $31^x$, gear $83^x$ carrying drive cylinder $47^x$ of an overrunning clutch $C^x$. This cylinder engages clutch rollers $52^x$ which function in the usual manner with cam $50^x$ fixed on shaft $31^x$. Segment $19^x$ may thus impart forward drive to shaft $31^x$ through countershaft 209 and overrunning clutch $C^x$, this reduced ratio drive being intermediate a direct drive from shaft $10^x$ to shaft $31^x$ and the reduction ratio afforded by segment 200 and countershaft gears 202, 203. Segment $20^x$ is directly drivingly connected to shaft $31^x$ as before.

In the operation of the Fig. 9 arrangement, segments 200 and $19^x$ function in much the same manner as that previously described in connection with segments 19 and 20. Likewise segments $19^x$ and $20^x$ function in substantially the same mannner as that previously described for segments 19 and 20. In starting the vehicle forwardly, with direct clutch teeth $63^x$ engaging clutch teeth $64^x$, the shaft $10^x$ is accelerated by the engine segment 200, affording the greatest torque multiplying drive and being the first runner segment to receive fluid from impeller $13^x$, performs the initial drive to shaft $54^x$ through the gearing $44^x$, 208, 203, 204 and clutch rollers 206. During this initial vehicle acceleration only segment 200 drives shaft $54^x$ until such time that segment $19^x$ begins to supplement segment 200 in driving shaft $54^x$. When the resistance to rotation of shaft $54^x$ is relatively great, as in initially starting the vehicle forwardly, the load requirements are such that only segment 200 will take up the drive since it operates through the lowest reduction gear train. At such time segment $19^x$ will rotate slower than segment 200 by the amount of difference in the gear train values respectively connected to segments $19^x$ and 200. Likewise segment $20^x$ will rotate slower than segment $19^x$ since shaft $54^x$ is being driven by segment 200 through the lowest reduction gear train.

Just as soon as the load on shaft $54^x$ diminishes sufficiently, segment $19^x$ supplements segment 200 in driving shaft $54^x$ and as the load further diminishes segment $20^x$ supplements segments 200 and $19^x$ in driving shaft $54^x$. As the segment $19^x$ progressively increases its power delivery, segment 200 progressively diminishes its power delivery until segment $19^x$ supplemented by segment $20^x$ takes over the entire load and segment 200 coasts around at the speed of impeller $13^x$ (barring slippage). Likewise segment $20^x$ thereafter progressively delivers more of the load and segment 19$^x$ less of the load until the load requirements are relatively low and segment 19$^x$ also coasts and segment 20$^x$ takes over the full driving load.

It will be apparent that the values of the gear trains which are respectively connected to segments 200 and 19$^x$ may be varied as desired and also the relative sizes or capacities of the various segments 13$^x$, 200, 19$^x$ and 20$^x$ so that a wide variation in the performance characteristics of the transmission may be obtained.

When segment 200 alone is driving through rollers 206, segment 19$^x$ rotates slower than segment 200, rollers 52$^x$ being free. When segments 200 and 19$^x$ are both operating then both rollers 52$^x$ and 206 are wedged and obviously segment 19$^x$ is still rotating slower than segment 200. As segment 19$^x$, supplemented by segment 20$^x$, takes over the load from segment 200, then segment 200 coasts, rollers 206 are free, and rollers 52$^x$ are still wedged. Similarly when segment 20$^x$ thereafter takes over all of the load from segment 19$^x$, both rollers 52$^x$ and 206 are free and segment 20$^x$ alone directly drives shaft 54$^x$.

If the load should increase materially while segment 20$^x$ alone is driving the vehicle, then segment 19$^x$ will supplement segment 20$^x$ in driving the vehicle and if the load requirements are sufficiently great then segment 200 will also assist in the drive.

Segment 200 drives alone only for a very short time in getting the vehicle started from a standstill and under most conditions when segment 200 is driving, segments 19$^x$ and 20$^x$ are also delivering power to shaft 54$^x$.

For reverse, gear 62$^x$ is meshed with idler gear 59$^x$ and shaft 31$^x$ is driven in the same manner as previously described for the forward vehicle drive, it being obvious that the reverse gear train has nothing to do with the characteristics of the fluid coupling in driving shaft 31$^x$.

In Fig. 10 the arrangement of parts employs planetary gear trains instead of countershaft trains as in Fig. 9, but the respective trains function with their runner segments in the same manner as in Fig. 9. I have therefore, in the interests of clarity and brevity, applied reference characters in Fig. 10 identical to those in Fig. 9 where the parts are the same and employed an exponent "y" where the parts have generally similar functions but differ structurally. Thus the auxiliary runner segment 200 for initial acceleration of the vehicle is directly drivingly connected to sun gear 201$^y$ meshed with planet pinions 202$^y$ which in turn engage a fixed internal gear 210. Cylinder 205 which drives cam 207 through clutch rollers 206 is fixed to carrier 208 of pinions 202$^y$.

Segment 19$^x$ drives shaft 31$^x$ through the overrunning clutch C$^x$ by reason of another planetary gear train which is somewhat faster than that connected to segment 200. This further train comprises a sun gear 44$^y$ which turns with segment 19$^x$, the sun gear meshing with planet pinions 45$^y$ which engage fixed internal gear 46$^y$. The carrier 46$^y$ is formed with the cylinder 47$^x$ of clutch C$^x$.

The operation of the Fig. 10 mechanism is identical to that of Fig. 9, segment 200 starting the drive to shaft 54$^x$ (it being assumed that clutch teeth 63$^x$ are engaged with direct drive clutch teeth 64$^x$) through gearing 201$^y$, 202$^y$ and rollers 206, the drive very quickly being supplemented by segment 19$^x$ (which runs slower than segment 200 and driving through gears 44$^y$, 45$^y$ and rollers 52$^x$) and by segment 20$^x$ (which runs slower than segment 19$^x$ and drives by direct connection to shaft 31$^x$). The power transmitted by segments 19$^x$ and 20$^x$ progressively increases as the vehicle accelerates, with resulting reduction in load resistance, until segment 200 coasts and segments 19$^x$ and 20$^x$ carry all of the load. Finally, segment 20$^x$ takes over the full load and segment 19$^x$ coasts as before described in connection with Fig. 9. The operation of the reverse drive and the overrunning clutch rollers 206 and 52$^x$ is the same as in Fig. 9.

If desired additional auxiliary runner segments may be employed, each having its torque multiplying gear train and overrunning clutch as will be apparent from my disclosure.

I do not limit my invention, in the broader aspects thereof, to any particular combination and arrangement of parts such as shown and described for illustrative purposes since various modifications will be apparent from the teachings of my invention and scope thereof as defined in the appended claims.

I claim:

1. In a motor vehicle power transmission, a driving shaft adapted to be driven by a motor of the vehicle, a driven shaft adapted to drive the vehicle, a fluid coupling of inflo-turbine type for drivingly connecting said shafts including a rotatable impeller having a plurality of segmentally shaped radially disposed fluid circulating passages formed therein for circulating the fluid in said coupling, said coupling further including a plurality of runners each having a plurality of segmentally shaped radially disposed fluid circulating passages formed therein, and means including the disposition of the runners whereby said runners successively receive the fluid circulated by said impeller, one of said runners receiving the fluid directly from said impeller and another of said runners discharging the fluid directly to said impeller, means for establishing a direct drive connection between said last runner and said driven shaft, means including a torque multiplying gear train for drivingly connecting the other runner to said driven shaft, said last means also including overrunning clutch means for permitting overrun of said other runner relatively to said shaft.

2. In a motor vehicle power transmission, a driving shaft adapted to be driven by the motor of said vehicle, a driven shaft adapted to drive the vehicle, a fluid coupling of the inflo-turbine type for drivingly connecting said shafts including a rotatable impeller having a plurality of segmentally shaped radially disposed fluid circulating passages formed therein for circulating the fluid in said coupling, said coupling further including relatively rotatable primary and secondary runners each having a plurality of segmentally shaped radially disposed fluid circulating passages formed therein, and means including the disposition of said runners whereby said runners successively receive the fluid circulated by said impeller, said primary runner being so disposed as to receive the fluid discharged from the impeller and to discharge the fluid therefrom to said secondary runner and said secondary runner being so disposed as to receive the fluid discharged from said primary runner and to discharge the fluid therefrom to said impeller, said driven shaft being adapted for direct driving connection with said secondary runner, overrunning clutch means including clutch elements one of which is adapted for driving connection to said driven shaft, and means including a torque multiplying gear train for drivingly connecting said primary runner to the other of said overrunning clutch elements.

3. In a motor vehicle power transmission, a driving shaft adapted to be driven by the motor of said vehicle, a driven shaft adapted to drive the vehicle, a fluid coupling of the inflo-turbine type for drivingly connecting said shafts including a rotatable impeller having a plurality of radially disposed passages formed therein, said coupling further including relatively rotatable primary and secondary runners each having a plurality of radially disposed passages formed therein, said impeller passages and said runner passages being of segmental form and cooperating with one another to form a plurality of substantially circular fluid circulating circuits, and means including the disposition of said runners whereby said runners successively receive the fluid circulated by said impeller, the passages of said primary runner being so disposed as to receive the fluid discharged from the impeller passages and to discharge the fluid therefrom to said secondary runner passages, and said secondary runner passages being so disposed as to receive the fluid discharged from said primary runner passages and to discharge the fluid therefrom to said impeller passages, said driven shaft being adapted for direct driving connection with said secondary runner, overrunning clutch means including clutch elements one of which is adapted for driving connection to said driven shaft, and means including a torque multiplying gear train for drivingly connecting said primary runner to the other of said overrunning clutch elements.

4. In a motor vehicle power transmission, a driving shaft adapted to be driven by the motor of said vehicle, a driven shaft adapted to drive the vehicle, a fluid coupling of the inflo-turbine type for drivingly connecting said shafts including a rotatable impeller having a plurality of segmentally shaped radially disposed fluid circulating passages formed therein for circulating the fluid in said coupling, said coupling further including relatively rotatable primary and secondary runners each having a plurality of segmentally shaped radially disposed fluid circulating passages formed therein, and means including the disposition of said runners whereby said runners successively receive the fluid circulated by said impeller, said primary runner being so disposed as to receive the fluid discharged from the impeller and to discharge the fluid therefrom to said secondary runner and said secondary runner being so disposed as to receive the fluid discharged from said primary runner and to discharge the fluid therefrom to said impeller, said driven shaft being adapted for direct driving connection with said secondary runner, overrunning clutch means including clutch elements one of which is adapted for driving connection to said driven shaft, a planetary pinion having a carrier drivingly connected to the other of said overrunning clutch elements, a relatively fixed annulus gear meshing with said planetary pinion, a sun gear meshing with said planetary pinion, and means for driving said sun gear from said primary runner.

5. In a motor vehicle power transmission, a driving shaft adapted to be driven by the motor of said vehicle, a driven shaft adapted to drive the vehicle, a fluid coupling of the inflo-turbine type for drivingly connecting said shafts including a rotatable impeller having a plurality of segmentally shaped radially disposed fluid circulating passages formed therein for circulating the fluid in said coupling, said coupling further including relatively rotatable primary and secondary runners each having a plurality of segmentally shaped radially disposed fluid circulating passages formed therein, and means including the disposition of said runners whereby said runners successively receive the fluid circulated by said impeller, said primary runner being so disposed as to receive the fluid discharged from the impeller and to discharge the fluid therefrom to said secondary runner and said secondary runner being so disposed as to receive the fluid discharged from said primary runner and to discharge the fluid therefrom to said impeller, said driven shaft being adapted for direct driving connection with said secondary runner, overrunning clutch means including clutch elements one of which is adapted for driving connection to said driven shaft, a sun gear driven by the other of said overrunning clutch elements, a relatively fixed annulus gear and a planetary pinion meshing with said sun and annulus gears and having a carrier drivingly connected with said driven shaft.

6. In a motor vehicle power transmission, a driving shaft adapted to be driven by the motor of said vehicle, a fluid coupling of the inflo-turbine type for drivingly connecting said shafts including a rotatable impeller having a plurality of segmentally shaped radially disposed fluid circulating passages formed therein for circulating the fluid in said coupling, said coupling further including relatively rotatable primary and secondary runners each having a plurality of segmentally shaped radially disposed fluid circulating passages formed therein, and means including the disposition of said runners whereby said runners successively receive the fluid circulated by said impeller, said primary runner being so disposed as to receive the fluid discharged from the impeller and to discharge the fluid therefrom to said secondary runner and said secondary runner being so disposed as to receive the fluid discharged from said primary runner and to discharge the fluid therefrom to said impeller, a secondary driven shaft adapted to drive the vehicle, a primary driven shaft intermediate said driving shaft and said secondary driving shaft, means for directly drivingly connecting said secondary runner with said primary shaft, means operable for selectively drivingly connecting said primary shaft with said secondary shaft for direct drive therebetween or for driving said secondary shaft in a direction opposite to that of said primary shaft, and gear train driving means adapted to drivingly connect said primary runner with said secondary shaft for transmitting a torque multiplying drive from said primary runner to said secondary shaft when said primary and said secondary shafts are directly drivingly connected, said torque multiplying driving means including an overrunning clutch interposed in the drive from said primary runner to said secondary shaft and so constructed and arranged as to provide overrun of said primary runner by said secondary runner.

7. In a motor vehicle power transmission, a driving shaft adapted to be driven by the motor of said vehicle, a fluid coupling of the inflo-turbine type for drivingly connecting said shafts including a rotatable impeller having a plurality of segmentally shaped radially disposed fluid circulating passages formed therein for circulating the fluid in said coupling, said coupling further including relatively rotatable primary and secondary runners each having a plurality of segmentally shaped radially disposed fluid circulating passages formed therein, and means including the disposition of said runners whereby said runners successively receive the fluid circulated by said impeller, said primary runner being so disposed as to receive the fluid discharged from the impeller and to discharge the fluid therefrom to said secondary runner and said secondary runner being so disposed as to receive the fluid discharged from said primary runner and to discharge the fluid therefrom to said impeller, a secondary driven shaft adapted to drive the vehicle, a primary driven shaft intermediate said driving shaft and said secondary shaft, means for directly drivingly connecting said secondary runner with said primary shaft, a countershaft having a forwardly driving gear and a reverse gear, a reverse idler gear driven by said countershaft, means for driving said countershaft from said primary runner, an overrunning clutch having inner and outer clutching elements, said inner element having splined connection with said secondary shaft, clutch teeth driven with said inner element, gear teeth driven with said outer element, said overrunning clutch being shiftable along said secondary shaft to selectively clutch said clutch teeth to said primary shaft with said gear teeth meshing with said countershaft forwardly driving gear or to mesh said gear teeth with said reverse idler gear, and means for drivingly connecting said outer element with said secondary shaft in response to shifting said overrunning clutch to mesh said gear teeth with said reverse idler gear as aforesaid.

8. In a motor vehicle power transmission, a driving shaft adapted to be driven by the motor of said vehicle, a fluid coupling for drivingly connecting said shafts, said coupling being of the inflo-turbine type and including a rotatable impeller having a plurality of segmentally shaped radially disposed fluid circulating passages formed therein for circulating the fluid in said coupling, said coupling further including relatively rotatable primary and secondary runners each having a plurality of segmentally shaped radially disposed fluid circulating passages formed therein, and means including the disposition of said runners whereby said runners successively receive the fluid circulated by said impeller, said primary runner being so disposed as to receive the fluid discharged from the impeller and to discharge the fluid therefrom to secondary runner and said secondary runner being so disposed as to receive the fluid discharged from said primary runner and to discharge the fluid therefrom to said impeller, a secondary driven shaft adapted to drive the vehicle, a primary driven shaft intermediate said driving shaft and said secondary shaft, means for directly drivingly connecting said secondary runner with said primary shaft, a set of clutch teeth drivingly connected to said primary shaft, a pinion drivingly connected to said primary runner, a countershaft having a gear meshing with said pinion, a forwardly driving gear carried by said countershaft, an overrunning clutch having inner and outer clutching elements, means providing splined connection between said inner clutching element and said secondary shaft, gear teeth driven with said outer clutching element, a second set of clutch teeth driven with said inner clutching element, said overrunning clutch being shiftable along said secondary shaft to positions of selective adjustment respectively for meshing said gear teeth with said forwardly driving countershaft gear and for engaging the second said set of clutch teeth with the first said set of clutch teeth while maintaining said gear teeth in mesh with said forwardly driving countershaft gear.

9. In a motor vehicle power transmission, a driving shaft adapted to be driven by the motor of said vehicle, a fluid coupling of the inflo-turbine type for drivingly connecting said shafts including a rotatable impeller having a plurality of segmentally shaped radially disposed fluid circulating passages formed therein for circulating the fluid in said coupling, said coupling further including relatively rotatable primary and secondary runners each having a plurality of segmentally shaped radially disposed fluid circulating passages formed therein, and means including the disposition of said runners whereby said runners successively receive the fluid circulated by said impeller, said primary runner being so disposed as to receive the fluid discharged from the impeller and to discharge the fluid therefrom to said secondary runner and said secondary runner being so disposed as to receive the fluid discharged from said primary runner and to discharge the fluid therefrom to said impeller, a secondary driven shaft adapted to drive the vehicle, a primary driven shaft intermediate said driving shaft and said secondary shaft, means for directly drivingly connecting said secondary runner with said primary shaft, a set of clutch teeth drivingly connected to said primary shaft, a pinion drivingly connected to said primary runner, a countershaft having a gear meshing with said pinion, a forwardly driving gear carried by said countershaft, an overrunning clutch having inner and outer clutching elements, means providing splined connection between said inner clutching element and said secondary shaft, gear teeth driven with said outer clutching element, said overrunning clutch being shiftable along said secondary shaft to positions of selective adjustment respectively for meshing said gear teeth with said forwardly driving countershaft gear and for engaging the second said set of clutch teeth with the first said set of clutch teeth overrunning clutch interposed in the drive from said forwardly driving countershaft gear, said countershaft having a reverse gear, a reverse idler gear meshed with said countershaft reverse gear, a third set of clutch teeth driven with said secondary shaft, and a fourth set of clutch teeth driven with said outer clutching element, said overrunning clutch being shiftable to a further position of selective adjustment along said secondary shaft for engaging said gear teeth with said reverse idler gear and engaging said third set of clutch teeth with said fourth set of clutch teeth.

10. In a motor vehicle power transmission, a driving shaft adapted to be driven by the motor of said vehicle, a fluid coupling of the inflo-turbine type for drivingly connecting said shafts including a rotatable impeller having a plurality of segmentally shaped radially disposed fluid circulating passages formed therein for circulating the fluid in said coupling, said coupling further including relatively rotatable primary and secondary runners each having a plurality of segmentally shaped radially disposed fluid circulating passages formed therein, and means including the disposition of said runners whereby said runners successively receive the fluid circulated by said impeller; said primary runner being so disposed as to receive the fluid discharged from the impeller and to discharge the fluid therefrom to said secondary runner and said secondary runner being so disposed as to receive the fluid discharged from said primary runner and to discharge the fluid therefrom to said impeller, a secondary driven shaft adapted to drive the vehicle, a primary driven shaft intermediate said driving shaft and said secondary shaft, means for directly drivingly connecting said secondary runner with said primary shaft, means operable for selectively drivingly connecting said primary shaft with said secondary shaft for a direct drive therebetween or for driving said secondary shaft in a direction opposite to that of said primary shaft, gear train driving means adapted to drivingly connect said primary runner with said secondary shaft for transmitting a torque multiplying drive from said primary runner to said secondary shaft when said primary and secondary shafts are directly drivingly connected, said torque multiplying driving means including an overrunning clutch interposed in the drive from said primary runner to said secondary shaft and so constructed and arranged as to provide overrun of said primary runner by said secondary runner, a third driven shaft aligned with said secondary shaft, and a second overrunning clutch between said secondary shaft and a third driven shaft for transmitting a one-way drive therebetween.

11. In a motor vehicle power transmission, a driving shaft adapted to be driven by the motor of said vehicle, a driven shaft adapted to drive the vehicle, a fluid coupling of the inflo-turbine type for drivingly connecting said shafts including a rotatable impeller having a plurality of segmentally shaped radially disposed fluid circulating passages formed therein for circulating the fluid in said coupling, said coupling further including relatively rotatable auxiliary, primary and secondary runners each having a plurality of segmentally shaped radially disposed fluid circulating passages formed therein, and means including the disposition of said runners whereby said runners successively receive the fluid circulated by said impeller, said auxiliary runner being so disposed as to receive the fluid discharged from the impeller and to discharge the fluid therefrom to said primary runner and said secondary runner being so disposed as to receive the fluid discharged from said primary runner and to discharge the fluid therefrom to said impeller, said driven shaft being adapted for direct driving connection with said secondary runner, overrunning clutch means including clutch elements one of which is adapted for driving connection to said driven shaft, means including a torque multiplying gear train for drivingly connecting said primary runner to the other of said overrunning clutch elements, second overrunning clutch means including clutch elements one of which is adapted for driving connection to the driven shaft and means including a second torque multiplying gear train of greater torque multiplying value than that of the first said gear train for drivingly connecting said auxiliary runner to the other clutch element of said second overrunning clutch means.

12. In a motor vehicle power transmission, a driving shaft adapted to be driven by a motor of the vehicle, a driven shaft adapted to drive the vehicle, a fluid coupling of the inflo-turbine type for drivingly connecting said shafts including a rotatable impeller having a plurality of segmentally shaped radially disposed fluid circulating passages formed therein for circulating the fluid in said coupling, said coupling further including a plurality of runners each having a plurality of segmentally shaped radially disposed fluid circulating passages formed therein, and means including the disposition of the runners whereby said runners successively receive the fluid circulated by said impeller, one of said runners receiving the fluid directly from said impeller and another of said runners discharging the fluid directly to said impeller, means for establishing a direct drive connection between said last runner and said driven shaft, means including a torque multiplying gear train for drivingly connecting the other runner to said driven shaft, said last means also including overrunning clutch means for permitting overrun of said other runner relatively to said shaft, and means operable for arresting rotation of one of said runners during rotation of said impeller, another of said runners having a plurality of fluid directing vanes provided with fluid directing portions so constructed and arranged as to cause the circulating fluid to rotate said other runner while said one runner is arrested by said arresting means.

13. In a motor vehicle power transmission, a driving shaft adapted to be driven by a motor of the vehicle, a driven shaft adapted to drive the vehicle, a fluid coupling of the inflo-turbine type for drivingly connecting said shafts including a rotatable impeller having a plurality of segmentally shaped radially disposed fluid circulating passages formed therein for circulating the fluid in said coupling, said coupling further including a plurality of runners each having a plurality of segmentally shaped radially disposed fluid circulating passages formed therein, and means including the disposition of the runners whereby said runners successively receive the fluid circulated by said impeller, one of said runners receiving the fluid directly from said impeller and another of said runners discharging the fluid directly to said impeller, means for establishing a direct drive connection between said last runner and said driven shaft, means including a torque multiplying gear train for drivingly connecting the other runner to said driven shaft, said last means also including overrunning clutch means for permitting overrun of said other runner relatively to said shaft, a casing for said gear train containing lubricating oil, and means for inducing flow of said oil from said casing into the fluid circulating circuit of said coupling and a return flow of air from said coupling to said casing in response to operation of said coupling.

14. In a motor vehicle power transmission, a driving shaft adapted to be driven by the motor of said vehicle, a driven shaft adapted to drive the vehicle, a fluid coupling of the inflo-turbine type for drivingly connecting said shafts including a rotatable impeller having a plurality of segmentally shaped radially disposed fluid circulating passages formed therein for circulating the fluid in said coupling, said coupling further including relatively rotatable primary and secondary runners each having a plurality of segmentally shaped radially disposed fluid circulating passages formed therein, and means including the disposition of said runners whereby said runners successively receive the fluid circulated by said impeller, said primary runner being so disposed as to receive the fluid discharged from the impeller and to discharge the fluid therefrom to said secondary runner and said secondary runner being so disposed as to receive the fluid discharged from said primary runner and to discharge the fluid therefrom to said impeller, said driven shaft being adapted for direct driving connection with said secondary runner, overrunning clutch means including clutch elements one of which is adapted for driving connection to said driven shaft, and means including a torque multiplying gear train for drivingly connecting said primary runner to the other of said overrunning clutch elements, and control means operable to provide connection of said primary runner to said driven shaft with said secondary runner drivingly disconnected with said driven shaft.

HERBERT F. PATTERSON.

CERTIFICATE OF CORRECTION.

Patent No. 2,203,177. June 4, 1940.

HERBERT F. PATTERSON.

It is hereby certified that error appears in the printed specification of the above numbered patent requiring correction as follows: Page 8, first column, line 56, claim 8, before the word "secondary" insert --said--; and second column, line 50, claim 9, for "overrunning clutch interposed in the drive from" read --while maintaining said gear teeth in mesh with--; and that the said Letters Patent should be read with this correction therein that the same may conform to the record of the case in the Patent Office.

Signed and sealed this 21st day of January, A. D. 1941.

(Seal)

Henry Van Arsdale,
Acting Commissioner of Patents.